United States Patent
Rinkel et al.

(10) Patent No.: US 7,496,171 B2
(45) Date of Patent: Feb. 24, 2009

(54) METHOD FOR ESTIMATING THE RADIATION SCATTERED IN A TWO-DIMENSIONAL DETECTOR

(75) Inventors: Jean Rinkel, San Francisco, CA (US); Jean-Marc Dinten, Lyons (FR)

(73) Assignee: Commissariat a l'Energie Atomique, Paris (FR)

( * ) Notice: Subject to any disclaimer, the term of this patent is extended or adjusted under 35 U.S.C. 154(b) by 122 days.

(21) Appl. No.: 11/672,809

(22) Filed: Feb. 8, 2007

(65) Prior Publication Data
US 2007/0189440 A1  Aug. 16, 2007

(30) Foreign Application Priority Data
Feb. 10, 2006 (FR) .................... 06 50492

(51) Int. Cl.
*A61B 6/00* (2006.01)
(52) U.S. Cl. .................... 378/7; 378/207; 378/901
(58) Field of Classification Search .............. 378/4–20, 378/62, 98.4, 145, 147, 149, 207, 98.8, 901
See application file for complete search history.

(56) References Cited

U.S. PATENT DOCUMENTS 6,594,338 B2 * 7/2003 Darboux et al. ............ 378/98.4
7,031,427 B2 * 4/2006 Dinten et al. .................. 378/7

OTHER PUBLICATIONS

Robert A. Close, et al., "Regularization method for scatter-glare correction in fluoroscopic images", Medical Physics, vol. 26, No. 9, Sep. 1999, pp. 1794-1801.
Yoshiki Kawata, et al., "3-D Image Reconstruction with Veiling Glare Correction to Improve the Contrast of 3-D Reconstructed Vascular Images", IEEE Transactions of Nuclear Science, vol. 43, No. 1, Feb. 1996, pp. 304-309.

* cited by examiner

*Primary Examiner*—Courtney Thomas
(74) *Attorney, Agent, or Firm*—Oblon, Spivak, McClelland, Maier & Neustadt, P.C.

(57) ABSTRACT

The radiation scattered in a two-dimensional detector (2) by a radiation is estimated by subjecting the detector (2) to at least two irradiations by inserting an array (3) of separated absorbers placed at variable distances (L) from the detector (2), measuring the (scattered) radiation at the shadow spots (6) of the absorbers and interpolating elsewhere to provide continuous images of the scattered radiation, and by deducing parameters modelling a scattered radiation distribution function in the detector.

8 Claims, 3 Drawing Sheets

METHOD FOR ESTIMATING THE RADIATION SCATTERED IN A TWO-DIMENSIONAL DETECTOR

This invention relates to a method for estimating, so as to correct, the radiation scattered in a two-dimensional detector, in particular for X-ray radiographic or tomographic acquisitions; it may also be applied to other acquisition methods and other types of radiation.

The radiation directed toward an object to be studied, then toward a two-dimensional detector placed behind it, undergoes attenuation by the object that gives a primary radiation, useful for the measurement. The detector also receives radiation scattered by the object, which disrupts the measurement, the correction of which is the objective of many methods in the prior art. The scattered radiation considered here is a supplementary scattered radiation of another type, produced inside the detector by various modes of interaction between the radiation and the material of the detector. An ordinary detector includes filters, then a layer for conversion of the X-rays into photons, a layer for conversion of the photons into electrons, a readout circuit and a back substrate. The radiation can be scattered in any of these layers, and in particular by the filters, in the layer for conversion into photons and in the substrate, where a back-scattering, causing the radiation to come to the front of the detector through the readout circuit, can be detected after having been absorbed by the scintillator. This radiation scattered in the sensor also adversely affects the precision of the measurement and must be corrected.

The known methods do not make a distinction between the scattered radiation of the object and the scattered radiation in the sensor, but apply an overall correction. We can cite the articles of Close R. A., Shah K. C. and Whiting J. S. 1999: "Regularization method for scatter-glare correction in fluoroscopic image" (Medical Physics, 26(9), p. 1794-1801), and Kawata Y. and Niki N., 1996: "3-D Image Reconstruction with Veiling Glare correction to Improve the Contrast of 3-D Reconstructed Vascular Images" (IEEE Transaction On Nuclear Science, Vol. 43, No. 1, p. 304-309). In the first of these articles, applied to radiography, the scattered radiation is modelled as a convolution of the primary radiation P(x) and by a constant $\beta_0$. The total radiation at each pixel x of the detector is thus given by the equation:

$$I(x)=P(x)+\alpha H(x)*P(x)+\beta_0+N(x)$$

where $\alpha$ is a constant and N(x) is the noise on the image. The primary radiation P is evaluated by performing an approximation on this equation, valid if the scattered radiation is low enough. The deconvolution, which would be necessary to obtain the primary radiation P(x) by inverting the above equation, is then replaced by a convolution of the total radiation I(x).

In the second of these articles, applied to three-dimensional angiography, the scattered radiation $I_{sg}$ is modelled as a convolution of the primary radiation P by a convolution kernel $h_{sg}$ according to the equation $I_{sg}=(CI_p)*h_{sg}$, where C is a constant. The deconvolution, for determining the primary radiation, is performed by means of a fast Fourier transform.

As mentioned, the methods described above do not distinguish the radiation scattered by the object from the radiation scattered in the detector. The radiation scattered by the object has a much larger span than the radiation scattered in the detector in the span of the image, so that an estimation common to the two categories of scattered radiation attributes an excessive span to the radiation scattered in the detector and therefore fails to suitably evaluate it, which alters the quality of the image in the high-contrast areas, where the effect of the radiation scattered in the detector is more sensitive. It should also be noted that the radiation scattered by the object may differ according to the acquisition method, which leads it to be corrected in a specialised manner.

An advantageous feature of the invention is that the radiation scattered in the detector is evaluated separately, while the radiation scattered in the object may be corrected by a different method.

In its most general form, the invention relates to a method for estimating radiation scattered in a two-dimensional detector, characterised in that it consists of: obtaining, using an identical radiation, a direct irradiation measurement of the detector, a first indirect irradiation measurement of the detector by interposing an absorber composed of a two-dimensional array of radiation-absorbing elements at a first distance from the detector, and a second indirect irradiation measurement of the detector by interposing the absorber at a second distance from the detector; deducing a first scattered radiation image and a second scattered radiation image on the detector from the first and second indirect irradiation measurement; calculating a first parameter associated with a span of the radiation scattered in the detector by a comparison of the first scattered radiation image and the second scattered radiation image, and a second parameter associated with an intensity of the radiation scattered in the detector by a comparison of the direct irradiation image and one of the indirect irradiation images; and, when a radiation of an object to be studied has been measured, correcting this radiation by a deconvolution calculation using the parameters.

In an alternative, the images of the scattered radiation are obtained simultaneously by means of an array of a plurality of layers or groups of absorbing elements, which are distinguished from the others either by the distance of the elements from the detector or by their absorption surface, or both, and which each contribute to the formation of one of these images.

More images of the scattered radiation may enhance the quality of the final result.

In its preferred form, the first parameter is a standard deviation of a Gaussian function and the second parameter is a pixel distribution function of the detector, the functions being two-dimensional on the detector.

In a more specifically preferred form, the first and the second parameters are estimated by the formulas:

$$PF_i = PF\_0 \times \int_{r=\gamma_i \times r_{BS}}^{\infty} dr \int_{\theta=0}^{2\pi} DC_0 \times \exp\left(-\frac{r^2}{2\sigma^2}\right) \times r \times d\theta$$

where PF_0 is an image of the direct irradiation measurement, $PF_i$ is the image of the total scattered radiation of number i, $\sigma$ is the first parameter, $DC_0$ is the second parameter, r and $\theta$ are integration parameters, $r_{BS}$ is radiation outside of the absorbing elements, and $\gamma_i$ is a magnification of the absorbing elements on the scattering radiation image of number i.

The following figures will make it easier to understand the invention through a specific embodiment thereof:

Figure 1:
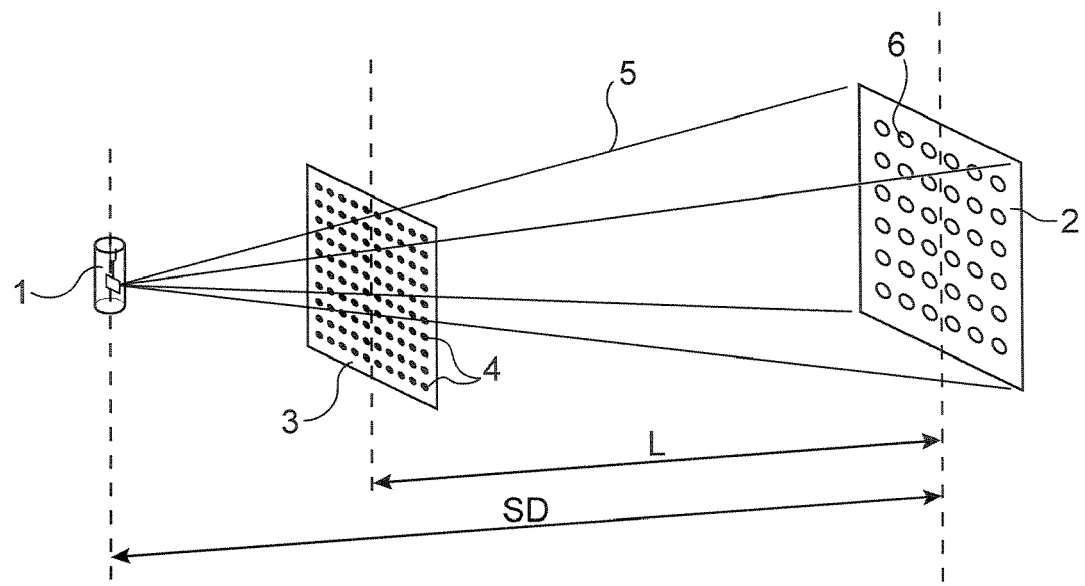
FIGS. 1 and 2 show two successive irradiations of the detector.

We will now describe the figures. The first step of the method, shown in FIG. 1, consists of a calibration performed with the source 1 of the radiation 5 used for the measurement and the measurement detector 2, but without the object to be studied. The radiation 5 is conical with an apex merging with the source 1. A first measurement is performed with a direct irradiation of the detector to give an acquisition PF_0 by the detector 2 under full flow, without any attenuation. The acquisition PF_0 is therefore an image of the radiation of the source 1 on the detector 2 and the radiation scattered in the detector 2.

Other calibration acquisitions involve the use of an absorber 3, which is a planar array of small balls 4 absorbing the radiation ("beam-stops") and separated by known distances, conventionally used in other methods for measuring scattered radiation. The rays traversing the balls 4 are completely absorbed and they are projected in shadow spots 6 on the detector 2. The absorber 3 and the source 1 are at known distances L and SD from the detector 2.

A new acquisition PF_BS is performed with the interposed absorber 3, and the corresponding image PF can be linked to the preceding acquisition image PF_0 by the equation (1), $$PF = PF\_0 \times \int_{r=\gamma \cdot r_{BS}}^{\infty} dr \int_{\theta=0}^{2\pi} DC_0 \times \exp\left(-\frac{r^2}{2\sigma^2}\right) \times r \times d\theta$$

where $DC_0$ and $\sigma$ are parameters modelling the radiation scattered in the detector 2 that must be calculated, $\gamma$ is the magnification of the balls 4 on the image, equal to the formula $$\gamma = \frac{SD}{SD - L},$$

$r_{BS}$ is the ray of the balls 4, and r and $\theta$ are integration parameters; the multiplications are performed separately for each of the pixels of the detector 2. This equation is calculated for each shadow spot 6 centre, by expressing that this point receives a contribution of scattered radiation in Gaussian form coming from the rest of the span of the detector 2, which is lower and lower according to the distance from the source of the scattered radiation, but excluding the contribution of the shadow spot 6, which receives no direct radiation.

The image PF results from the processing of the acquisition PF_BS performed by the detector 2, using the acquisition values for the places of the detector 2 located in the shadow spots 6 and interpolation values between the values measured elsewhere at the shadow spots 6. The primary radiation is then eliminated, the PF image expresses only a first estimation of the radiation scattered in the detector 2. However, this estimation is not the desired result, and the method is continued.

Figure 2:
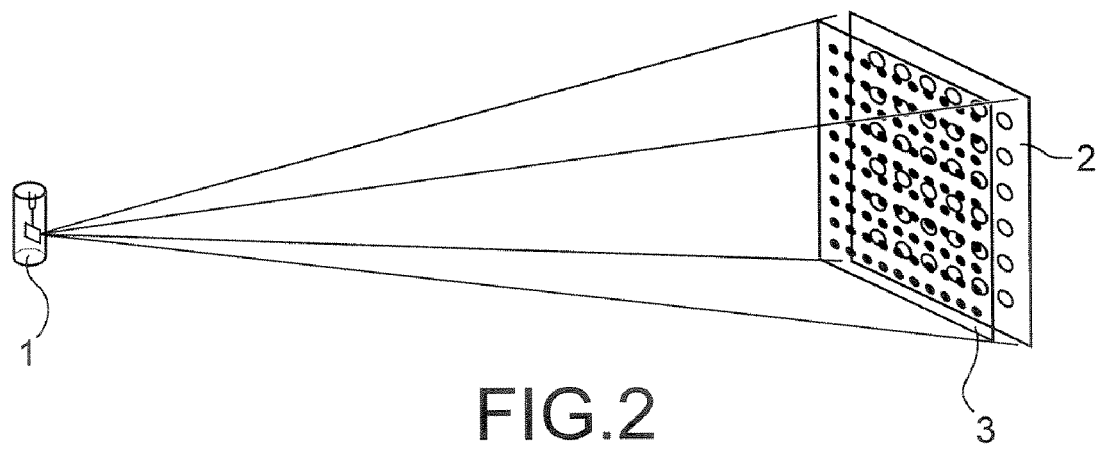

The next calibration step is performed with the same device, except that the absorber 3 is placed directly on the detector 2, with L=0, as shown in FIG. 2. An acquisition PF_BS' is obtained in the same way as the acquisition PF_BS, and an image PF' is again deduced from it by linear interpolations between the values measured under the balls 4. An equation (2)

$$PF' = PF\_0 \times \int_{r=r_{BS}}^{\infty} dr \int_{\theta=0}^{2\pi} DC_0 \times \exp\left(-\frac{r^2}{2\sigma^2}\right) \times r \times d\theta$$

linking the image PF' to the image PF_0 and analogous to the previous one is also obtained; it differs therefrom in that the magnification of the balls 4 in this case is equal to 1.

No supplementary acquisition is necessary in this embodiment of the method, but it is still possible to perform others, at different distances L between the absorber 3 and the detector 2, in order to obtain final mean values of $\sigma$ and $DC_0$, probably more precise with a higher signal-to-noise ratio. The second acquisition could be performed at another distance L between the absorber 3 and the detector 2.

The next step in the method causes two intermediate coefficients to appear. A coefficient $\beta$ is the mean of the image PF/PF', obtained by calculating the ratio of the values of the images PF and PF' by indirect irradiation for each of their pixels, then by obtaining the mean of these ratios on the span of the images PF and PF'. It is possible to deduce from equations (1) and (2) that:

$$\sigma^2 = \frac{r_{BS}^2 \times (1 - \gamma^2)}{2\ln(\beta)}$$

The other coefficient $\alpha$ characterises the underestimation of the measurement of the radiation scattered in the sensor in the image PF. It is calculated by the following formula, established by the equation (1):

$$\alpha = \exp\left(-\frac{\gamma^2 \times r_{BS}^2}{2\sigma^2}\right)$$

It is deduced from this formula and equations (1) and (2) that:

$$DC_0 = \frac{1}{\alpha} \times \frac{PF}{PF\_0},$$

with the division of the two images being applied pixel-by-pixel and the function $DC_0$ therefore being a two-dimensional function of proportionality expressed as an image.

The radiation scattered in the detector 2, expressed by the coefficients $\sigma$ and $DC_0$, is then known in the calibrations.

When an actual measurement of an object is performed by the same system (the absorber 3 being removed), the radiation scattered by the detector 2, denoted DC, for the applied flow $\Phi$ will then be modelled by an equation DC ($\Phi$)=($\Phi$=$DC_0$)*K, in which the multiplication again represents a multiplication operation for each pixel, the asterisk represents a two-dimensional convolution operation on the surface of the detector 2, K is a scattered radiation distribution kernel of the sensor, which is assumed to be a normalised two-dimensional Gaussian function, of which the standard deviation is the parameter $\sigma$ calculated above.

For each of the pixels, in the acquisition of the object measurements, $$\Phi_{measure} = \Phi_{direct} + (\Phi_{direct} \times DC_0) * K$$

$\Phi_{measure}$ corresponds to the raw values of the acquisition and $\Phi_{direct}$ to the radiation reaching the detector 2 and which is the sum of the primary radiation attenuated by the object and the radiation scattered by the object.

The task to be performed consists of calculating $\Phi_{direct}$, which is done by a classic iteration method or using a Fourier transform since $DC_0$ and K (the latter by means of σ) are now known. The radiation scattered by the object can then be corrected by another method in order to give the primary radiation and the attenuation of the radiation of the source 1.

Figure 3:
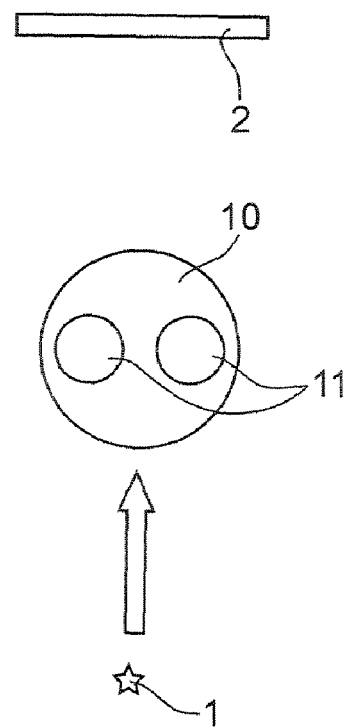
FIG. 3 shows an object being studied.
Figure 4A:
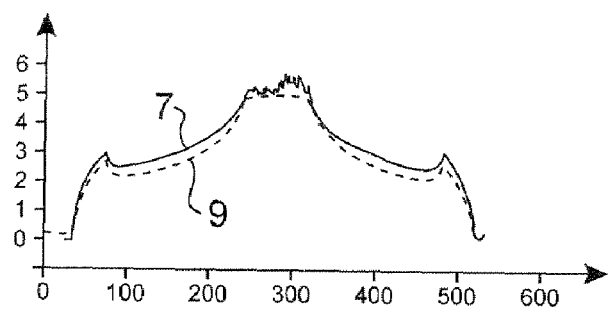
FIGS. 4a and 4b show measurement diagrams obtained with this object.
Figure 4B:
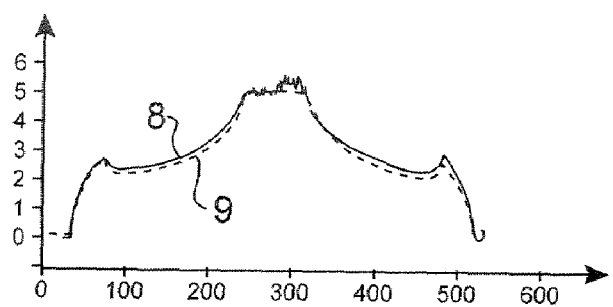

FIGS. 3 and 4 show a concrete application of the method for a cylindrical Plexiglas object 10 including two coaxial piercings 11 filled with air. FIG. 4a shows the acquisition values 7 obtained without correction of the scattered radiation of the detector 2, and FIG. 4b shows the direct radiation values 8 calculated by applying the method of the invention, compared with the real attenuation values 9, that should be obtained in both cases. It can be seen that the application of the invention gives much better results for both the rays traversing the heterogeneous portions (the air cylinders) and the rays traversing the transition portions between the air cylinders 11 and the Plexiglas matrix 10.

Figure 1A:
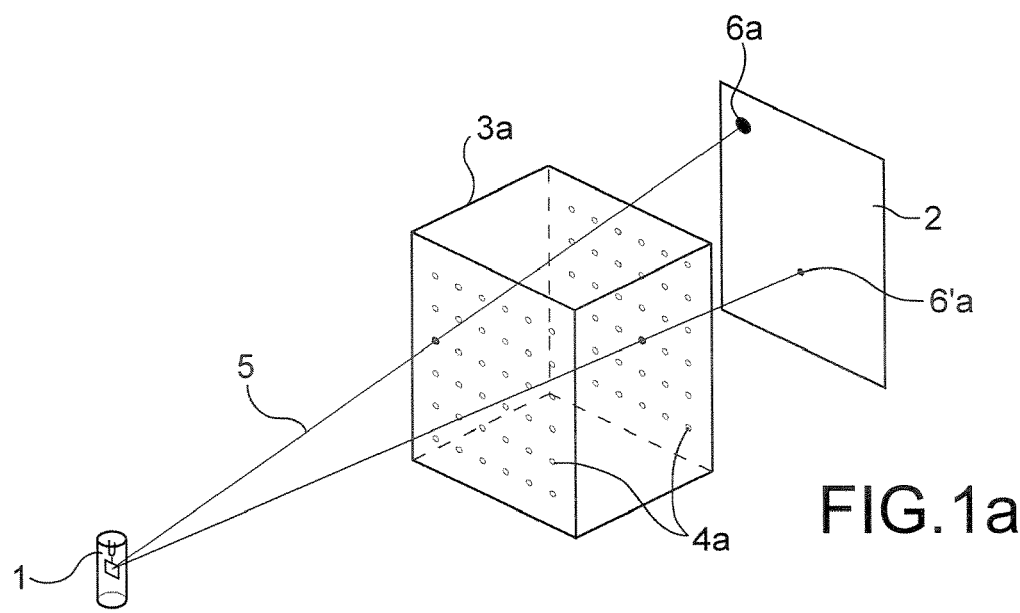
FIGS. 1a and 1b show two alternatives of the step of the method shown in FIG. 1.
Figure 1B:
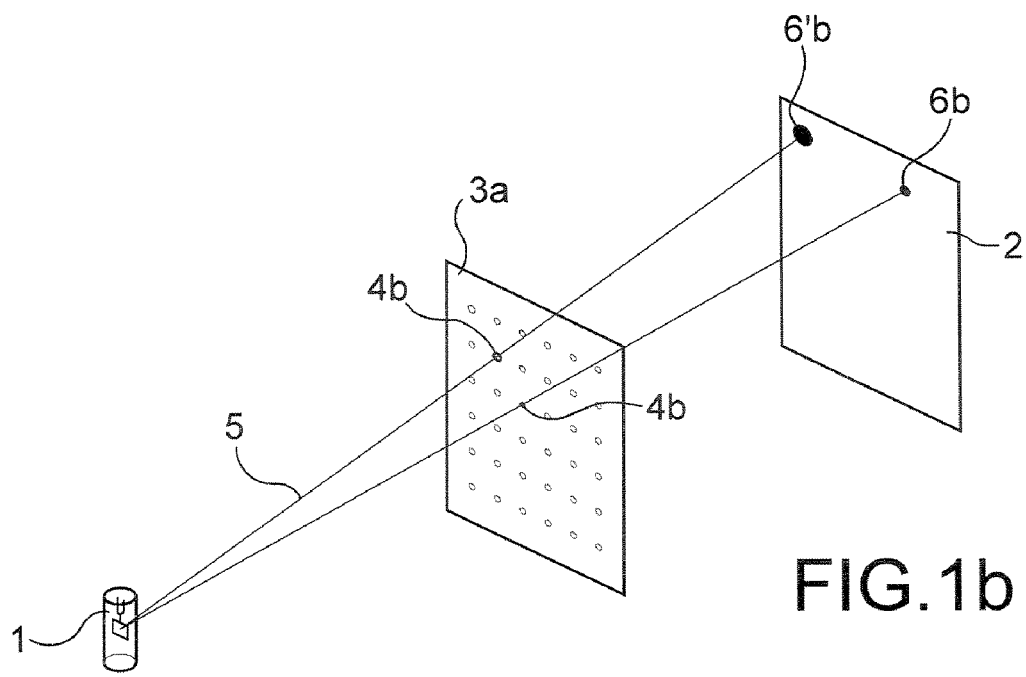

Finally, the two-dimensional array 3 of balls 4 can be replaced by an array 3a with multiple layers of balls 4 and 4a (FIG. 1a). Each of the layers then contributes simultaneously to a respective group of shadow spots 6a and 6'a on the detector 2 during the same measurement if the balls 4a and 4'a of the two layers are not aligned on lines for projection of the radiation 5. The same images of the scattered radiation are obtained by separately using the shadow spots 6a and 6'a of each group. It is also possible to consider (FIG. 1b) the use of an array of balls 4b and 4'b of different absorption surfaces on the same layer in order again to produce shadow spots 6b and 6'b with different surfaces, necessary for the formation of images of the scattered radiation. The primary advantage of these alternatives is to provide all images in a single measurement.

The invention claimed is:

1. A method for estimating radiation scattered in a two-dimensional detector, comprising:
    obtaining, using an identical radiation, a direct irradiation measurement of the detector, a first indirect irradiation measurement of the detector by interposing an absorber composed of a two-dimensional array of radiation-absorbing elements at a first distance from the detector, and a second indirect irradiation measurement of the detector by interposing the absorber at a second distance from the detector;
    deducing a first scattered radiation image and a second scattered radiation image on the detector from the first and second indirect irradiation measurements;
    calculating a first parameter associated with a span of the radiation scattered in the detector by a comparison of the first scattered radiation image and the second scattered radiation image, and a second parameter associated with an intensity of the radiation scattered in the detector by a comparison of the direct irradiation measurement and one of the indirect irradiation measurements; and
    when a radiation of an object to be studied has been measured, correcting this radiation by a deconvolution calculation using the parameters.

2. A method for estimating radiation scattered in a two-dimensional detector according to claim 1, wherein the first parameter is a standard deviation of a Gaussian function and the second parameter is a pixel distribution function of the detector, the functions being two-dimensional on the detector.

3. A method for estimating radiation scattered in a two-dimensional detector according to claim 2, wherein the first and the second parameters are estimated by the formulas:

$$PF_i = PF\_0 \times \int_{r=\gamma_i \times r_{BS}}^{\infty} dr \int_{\theta=0}^{2\pi} DC_0 \times \exp\left(-\frac{r^2}{2\sigma^2}\right) \times r \times d\theta$$

where $PF\_0$ is an image of the direct irradiation measurement, $PF_i$ is the image of the total scattered radiation of number i, σ is the first parameter, $DC_0$ is the second parameter, r and θ are integration parameters, $r_{BS}$ is radiation outside the absorbing elements, and γ, is a magnification of the absorbing elements on the scattering radiation image of number i.

4. A method for estimating a segment scattered in a two-dimensional detector according to claim 1, wherein the method also includes other measurements of indirect irradiation of the detector by interposing the absorber at other distances from the detector.

5. A method for estimating radiation scattered in a two-dimensional detector, comprising:
    obtaining, using an identical radiation, a direct irradiation measurement of the detector, a multiple indirect irradiation measurement of the detector by interposing an absorber composed of an array of radiation-absorbing elements at a distance from the detector, the elements being distributed in groups distinguished by different absorption surfaces and/or distances from the detector;
    deducing a first scattered radiation image and a second scattered radiation image on the detector from the multiple indirect irradiation measurement using the respective groups of absorbing elements;
    calculating a first parameter associated with a span of the radiation scattered in the detector by a comparison of the scattered radiation image and the second scattered radiation image, and a second parameter associated with an intensity of the radiation scattered in the detector by a comparison of the direct irradiation measurement and one of the indirect irradiation measurements; and
    when a radiation of an object to be studied has been measured, correcting this radiation by a deconvolution calculation using the parameters.

6. A method for estimating radiation scattered in a two-dimensional detector according to claim 5, wherein the first parameter is a standard deviation of a Gaussian function and the second parameter is a pixel distribution function of the detector, the functions being two-dimensional on the detector.

7. A method for estimating radiation scattered in a two-dimensional detector according to claim 6, wherein the first and the second parameters are estimated by the formulas:

$$PF_i = PF\_0 \times \int_{r=\gamma_i \times r_{BS}}^{\infty} dr \int_{\theta=0}^{2\pi} DC_0 \times \exp\left(-\frac{r^2}{2\sigma^2}\right) \times r \times d\theta$$

where $PF\_0$ is an image of the direct irradiation measurement, $PF_i$ is the image of the total scattered radiation of number i, σ is the first parameter, $DC_0$ is the second parameter, r and θ are integration parameters, $r_{BS}$ is radiation outside the absorbing elements, and $\gamma_i$ is a magnification of the absorbing elements on the scattering radiation image of number i.

8. A method for estimating a segment scattered in a two-dimensional detector according to claim 5, wherein the method also includes other measurements of indirect irradiation of the detector by interposing the absorber at other distances from the detector.

* * * * *